United States Patent Office 3,092,542
Patented June 4, 1963

3,092,542
INSECT COMBATTING AGENT
Lyle D. Goodhue, Bartlesville, Kenneth E. Cantrel, Dewey, and Rector P. Louthan, Bartlesville, Okla., assignors to Phillips Petroleum Company, a corporation of Delaware
No Drawing. Filed Sept. 19, 1961, Ser. No. 139,067
13 Claims. (Cl. 167—22)

This invention relates to a new class of chemical compounds. In one of its aspects, this invention relates to a method of preparing a new class of chemical compounds. In another of its aspects, this invention relates to a method of repelling an insect. In yet another aspect, this invention relates to a method of combatting an insect. In still another aspect, this invention relates to an insect repelling composition and to a method of preparing the same. In a more specific aspect of the invention, it relates to a new class of compounds applicable for combatting insects, especially to repel the same, the said class of compounds having the following structural characteristics:

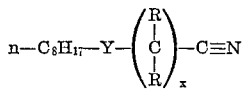

wherein Y is selected from the group consisting of —S— and

each R is selected from the group consisting of hydrogen, methyl, and ethyl, and $x$ is an integer of from 3 to 6.

Insecticides and repellents are widely used for the control of insects. In many cases, insecticides are chosen since it is desired to kill the insects and completely rid an area, such as a house, of these pests. On the other hand, it is often more desirable to employ repellents, particularly in such locations as restaurants, stores, and the like. Furthermore, repellents are widely used to protect people from being bitten and annoyed by insects.

It is an object of this invention to provide a new class of chemical compounds. It is a further object of this invention to provide a method and composition for repelling an insect. It is a further object of this invention to provide a method of combatting an insect. It is a still further object of this invention to provide a method of preparing a new class of chemical compounds.

Other aspects, objects, and the several advantages of this invention are apparent from a study of this disclosure and the appended claims.

We have now discovered that compounds of the formula

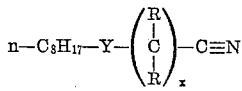

wherein Y is selected from the group consisting of —S— and

each R is selected from the group consisting of hydrogen, methyl, and ethyl, and $x$ is an integer of from 3 to 6, are effective in said repellents. The sulfoxides and thioethers of the above general formula can be prepared by a variety of methods. For example, n-octylmercaptans can be added to olefinic nitriles. The addition is most conveniently carried out in the presence of a free radical generator or supplier such as peroxides or ultraviolet light, although in some instances the addition can be carried out in the presence of a base if desired. Other methods, such as the reaction of the sodium or other alkali metal octyl mercaptide such as lithium or potassium mercaptide of n-octyl mercaptan with a halo-substituted nitrile, can also be used. The thioethers can then be oxidized to sulfoxides by means of hydrogen peroxide or organic peracids.

Some examples of compounds of the above formula which can be employed as repellents according to the method of this invention are:

4-(n-octylmercapto)butyronitrile
4-(n-octylsulfinyl)butyronitrile
5-(n-octylmercapto)valeronitrile
5-methyl-6-(n-octylsulfinyl)capronitrile
2,3,4-trimethyl-1-(n-octylmercapto)enanthronitrile
2,3-diethyl-7-(n-octylsulfinyl)pelargonitrile
3-ethyl-7-(n-octylmercapto)caprylonitrile
2,2,3,3,4,4,5,5,6,6,7-undecaethyl - 7-(n - octylsulfinyl)-pelargonitrile.

The compounds of this invention can, when used as repellents, be applied in conventional manners such as in solutions, emulsions, dust, wettable powders, aerosols, and the like. Solvents which can be employed include such materials as naphtha, kerosene, toluene, cyclohexanone, acetone, etc. One particularly effective solvent which can be used is an isoparaffinic hydrocarbon boiling in the approximate range of 260° F.–800° F. which is sold under the trademark Soltrol®.

The amount of repellent in the solutions, emulsions, etc., can vary over a wide range, but will generally be within the range of from 0.05 to 20 weight percent. In some instances, even lower concentrations can be used, and the upper limit is dictated primarily by economics.

When applying the repellents of this invention to an area from which it is desired to repel insects such as flies, the method of application will be chosen so as to deposit from 0.1 to 20 grams per 100 square feet. It is also to be understood that these repellents can be used as space sprays, employing such means as aerosol bombs.

The following specific example is intended to demonstrate the effectiveness as repellents of the compounds of this invention, but it is not intended to limit the invention to the particular embodiments shown therein.

EXAMPLE I

A series of runs were carried out in which 4-n-octylmercaptobutyronitrile and 4-n-octylsulfinylbutyronitrile were synthesized and tested as insect repellents.

In the synthesis of 4-n-octylmercaptobutyronitrile, 134 grams of allyl cyanide and 292 grams of n-octyl mercaptan were charged to a glass reactor in which a quartz tube for admission of ultraviolet light was mounted. The reactor was closed, mounted on a shaker, and the shaker started. The reactor contents were then exposed to the light of a 100 watt ultraviolet light for 10 minutes, after which a 450 watt UV was substituted for the 100 watt lamp, and irradiation continued for an additional one hour period. The reactor contents were then removed and distilled, resulting in the recovery of 90 grams of unreacted starting material and 285 grams of product, boiling at 125° C. at 0.15 mm. Hg absolute and having a refractive index $n_D^{20}$ —1.4738.

In the synthesis of 4-n-octylsulfinylbutyronitrile, 150 grams of the above-prepared 4-n-octylmercaptobutyronitrile was dissolved in 210 cc. of methanol, and the resulting solution was heated to reflux. Eighty grams of 30 percent by weight aqueous hydrogen peroxide was then added dropwise to the refluxing solution over a 20–30 minute period. The resulting mixture was then cooled, diluted with 250 ml. $H_2O$ and extracted with chloroform.

The organic phase was separated off, and from this phase the chloroform was stripped off under vacuum. After stripping, 160.9 grams of solid material remained. This solid was dissolved in and recrystallized from 50/50 n-pentane-ether, and 145.5 grams of material, M.P. 41° C.–44° C. was obtained.

The above-prepared compounds were then tested for repellency to various insects.

In one series of tests, the compounds were tested as repellents for houseflies, Musca domestica by a sandwich bait test. This test involves placement of a porous barrier treated with the candidate repellent between the starved houseflies and food. The bait is prepared by spreading a smooth thin film of unsulfured molasses on a 1 inch by 4 inch strip of cardboard, leaving a margin of at least ¼ inch on all sides. The purpose of the margin is to prevent the feeding of the insects unless they are actually on the strip, thus facilitating counting. These prepared strips are dried in an oven at 45° C.

Strips of lens paper were then impregnated with an acetone solution of the compound to be tested, after which these strips were dried in air for 6 hours. These strips were then superimposed over the baits and fastened in place by stapling. The sandwich baits were then placed in a cage of houseflies, over five days old, which had been starved for 6 hours. Counts of the number of flies feeding were then taken at periodic intervals. If the material is non-repellent, the flies quickly consume the molasses, often in less than 30 minutes. The results of these tests are expressed as Table I.

*Table I*

| Compound Tested | Conc. of Acetone Solution, Wt. Percent | Number of Flies Feeding at Inducted Time, Min. | | | | | | | | Estimted Molasses Remaining After 24 Hours |
|---|---|---|---|---|---|---|---|---|---|---|
| | | 5 | 15 | 30 | 45 | 60 | 90 | 120 | 150 | 165 | |
| A | 1.0 | 0 | 0 | 0 | 0 | 0 | 0 | 0 | 0 | 0 | 100 |
| B | 0.5 | 0 | 0 | 0 | 0 | 0 | 0 | 0 | 0 | 0 | 98 |

A = 4-n-octylmercaptobutyronitrile.
B = 4-n-octylsulfinylbutyronitrile.

In a further series of tests, the above-prepared compounds were tested as repellents for roaches.

In these tests, 3 inch by 5 inch cards were dipped in a 5 percent by weight solution of the candidate compounds, after which the cards were hung in a hood overnight. The next day, a total of 5 treated cards, including one untreated check, were placed in clear plastic cages, 8 inches by 8 inches by 12 inches, fitted with a screened top, and containing approximately 1,000 German roaches. The cards were placed so as to lean against the sides of the cage. If all five cards were non-repellent, each card would have approximately 200 roaches on it, since the roaches crawl up on the cards. The number of roaches on each of the cards was determined after 1 hour, and again after 2 hours. The results of these tests are expressed below as Table II.

*Table II*

| Compound | Roaches on Card | | Total Roaches | Percent Repellency [1] |
|---|---|---|---|---|
| | After 1 Hour | After 2 Hours | | |
| 4-n-octylmercaptobutyronitrile | 5 | 2 | 7 | 98 |
| 4-n-octylsulfinylbutyronitrile | 178 | 145 | 323 | 14 |
| Untreated Card | 190 | 185 | 375 | |

[1] Percent repellency = $100 - \left(\dfrac{\text{Total Roaches on treated card}}{\text{Total Roaches on untreated card}} \times 100\right)$ Roach powders can conveniently be prepared from the sulfides and sulfoxides described herein by spraying the compound in a suitable solvent, such as acetone, onto a solid carrier. Suitable solid carriers include synthetic calcium silicates, diatomaceous earths, pyrophilites, and silica gels. Presently preferred solid carriers are a synthetic calcium silicate sold as Microcel E and a finely divided silica gel sold as Santocel. Sufficient material is used so as to provide a powder containing, for example, about 5 weight percent of the nitrile after evaporation of the solvent. The mercapto compounds are presently preferred as roach repellents.

Reasonable variation and modification are possible within the scope of the disclosure and appended claims, the essence of which is that there is provided a new class of chemical compounds, a method of preparing the compounds, an insect repelling composition, and a method of combatting and repelling an insect, as described.

We claim:

1. A method of repelling an insect which comprises subjecting said insect to the repelling action of at least one compound selected from the group of compounds having the structural characteristics as follows:

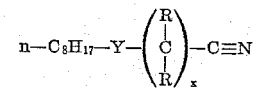

wherein Y is selected from the group consisting of —S— and

each R is selected from the group consisting of hydrogen, methyl, and ethyl, and x is an integer of from 3 to 6.

2. The method of claim 1 wherein each R is hydrogen and x is 3.

3. The method of claim 2 wherein Y is —S—.

4. The method of claim 2 wherein Y is

5. A method for combatting an insect which comprises subjecting said insert to the action of an effective amount of at least one compound selected from the group of compounds having the structural characteristics as follows:

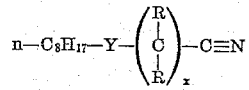

wherein Y is selected from the group consisting of —S— and

each R is selected from the group consisting of hydrogen, methyl, and ethyl, and x is an integer of from 3 to 6.

6. The method of claim 5 wherein each R is hydrogen and x is 3.

7. The method of claim 6 wherein Y is —S—.

8. The method of claim 6 wherein Y is

9. An insect repelling composition comprising a compound selected from the group of compounds having the structural charcteristics as follows:

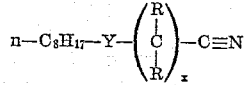

wherein Y is

each R is selected from the group consisting of hydrogen, methyl, and ethyl, and x is an integer of from 3 to 6 dispersed in a carrier.

10. The composition of claim 9 wherein each R is hydrogen and x is 3.

11.

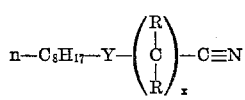

wherein each R is selected from the group consisting of hydrogen, methyl, and ethyl, Y is

and $x$ is an integer of from 3 to 6.

12. The compound of claim 11 wherein each R is hydrogen, Y is

and $x$ is 3.

13. A roach repelling composition comprising a compound having the structural characteristic

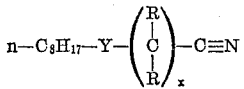

wherein Y is

each R is selected from the group consisting of hydrogen, methyl, and ethyl, and $x$ is an integer of from 3 to 6 and a solid carrier.

References Cited in the file of this patent
J.A.C.S., 69 (1947), page 693.